US012420265B2

United States Patent
He et al.

(10) Patent No.: US 12,420,265 B2
(45) Date of Patent: Sep. 23, 2025

(54) CERIUM-TIN-BASED COMPOSITE OXIDE CATALYST FOR CATALYZING PURIFICATION OF NITROGEN OXIDE, PREPARATION METHOD AND APPLICATION THEREOF

(71) Applicant: RESEARCH CENTER FOR ECO-ENVIRONMENTAL SCIENCES, CHINESE ACADEMY OF SCIENCES, Beijing (CN)

(72) Inventors: Hong He, Beijing (CN); Jingjing Liu, Beijing (CN); Yunbo Yu, Beijing (CN); Wenpo Shan, Beijing (CN); Xiaoyan Shi, Beijing (CN); Yulong Shan, Beijing (CN)

(73) Assignee: RESEARCH CENTER FOR ECO-ENVIRONMENTAL SCINCES, CHINESE ACADEMY OF SCIENCES, Beijing (CN)

( * ) Notice: Subject to any disclaimer, the term of this patent is extended or adjusted under 35 U.S.C. 154(b) by 598 days.

(21) Appl. No.: 17/790,018

(22) PCT Filed: Apr. 2, 2020

(86) PCT No.: PCT/CN2020/082926
§ 371 (c)(1),
(2) Date: Jun. 29, 2022

(87) PCT Pub. No.: WO2021/134957
PCT Pub. Date: Jul. 8, 2021

(65) Prior Publication Data
US 2023/0042287 A1    Feb. 9, 2023

(30) Foreign Application Priority Data
Dec. 31, 2019   (CN) .......................... 201911417967.9

(51) Int. Cl.
*B01J 23/30*     (2006.01)
*B01D 53/86*    (2006.01)
(Continued)

(52) U.S. Cl.
CPC .......... *B01J 23/30* (2013.01); *B01D 53/8628* (2013.01); *B01D 53/9418* (2013.01); *B01J 23/20* (2013.01);
(Continued)

(58) Field of Classification Search
CPC ... B01J 23/30; B01J 23/20; B01J 23/28; B01J 27/1813; B01J 35/23; B01J 37/009;
(Continued)

(56) References Cited

U.S. PATENT DOCUMENTS

2004/0102642 A1* 5/2004 Brazdil .................. B01J 23/002
558/325

FOREIGN PATENT DOCUMENTS

| CN | 101028594 A | 9/2007 |
| CN | 103433028 A | 12/2013 |

(Continued)

OTHER PUBLICATIONS

International Search Report for International Application No. PCT/CN2020/082926, mailed Sep. 29, 2020, 4 pages.
(Continued)

*Primary Examiner* — Stuart L Hendrickson
*Assistant Examiner* — Joshua Maxwell Speer
(74) *Attorney, Agent, or Firm* — Workman Nydegger

(57) ABSTRACT

The present application relates to a cerium-tin-based composite oxide catalyst for catalyzing purification of a nitrogen oxide, a preparation method and an application thereof. The catalyst has the following chemical composition: a cerium-tin oxide and an M oxide, wherein the M is selected from any one of or a combination of at least two of P, Ti, Zr, V, (Continued)

Mn, Fe, Cu, Al, Si, Ni, Hf, Nb, Ta, Cr, Mo, W, or Re. According to the present application, a cerium-tin-based composite oxide catalyst having the characteristics such as high catalytic activity, high hydrothermal stability, excellent $N_2$ generation selectivity, a wide operation temperature window, and adaptation to high space velocity reaction conditions is prepared by means of a non-toxic and harmless raw material and a simple method, and the present application is applicable to a device for catalyzing purification of a mobile source nitrogen oxide represented by diesel vehicle exhaust gas and a fixed source nitrogen oxide represented by flue gas from a coal-fired power plant.

13 Claims, 4 Drawing Sheets

(51) Int. Cl.
| | |
|---|---|
| B01D 53/94 | (2006.01) |
| B01J 23/20 | (2006.01) |
| B01J 23/28 | (2006.01) |
| B01J 27/18 | (2006.01) |
| B01J 35/45 | (2024.01) |
| B01J 37/00 | (2006.01) |
| B01J 37/02 | (2006.01) |
| B01J 37/03 | (2006.01) |
| B01J 37/04 | (2006.01) |
| B01J 37/06 | (2006.01) |
| B01J 37/08 | (2006.01) |
| F01N 3/20 | (2006.01) |
| F01N 3/28 | (2006.01) |

(52) U.S. Cl.
CPC .......... *B01J 23/28* (2013.01); *B01J 27/1813* (2013.01); *B01J 37/009* (2013.01); *B01J 37/0205* (2013.01); *B01J 37/0213* (2013.01); *B01J 37/0236* (2013.01); *B01J 37/031* (2013.01); *B01J 37/036* (2013.01); *B01J 37/04* (2013.01); *B01J 37/06* (2013.01); *B01J 37/086* (2013.01); *F01N 3/2066* (2013.01); *F01N 3/2803* (2013.01); B01D 2255/2065 (2013.01); B01D 2255/20776 (2013.01); B01D 2255/2094 (2013.01); B01D 2255/40 (2013.01); *B01J 35/45* (2024.01); *F01N 2370/04* (2013.01); *F01N 2610/02* (2013.01)

(58) Field of Classification Search
CPC  B01J 37/0205; B01J 37/0213; B01J 37/0236; B01J 37/031; B01J 37/036; B01J 37/04; B01J 37/06; B01J 37/086; B01J 35/45; B01J 2523/00; B01J 23/002; B01J 23/14; B01J 23/10; B01D 53/8628; B01D 53/9418; B01D 2255/2065; B01D 2255/20776; B01D 2255/2094; B01D 2255/40; B01D 2251/2062; B01D 2255/209; B01D 2257/404; B01D 2258/012; B01D 2258/0283; B01D 53/9413; B01D 2258/01; F01N 3/2066; F01N 3/2803; F01N 2370/04; F01N 2610/02; F01N 2510/06; Y02A 50/20
See application file for complete search history.

(56) References Cited

FOREIGN PATENT DOCUMENTS

| | | | |
|---|---|---|---|
| CN | 105664912 A | * | 6/2016 |
| JP | 2013198888 A | * | 10/2013 |

OTHER PUBLICATIONS

Chinese First Office Action for Chinese Application No. 201911417967.9, 7 pages with translation.

Chinese Second Office Action for Chinese Application No. 201911417967.9, 8 pages with translation.

* cited by examiner

CERIUM-TIN-BASED COMPOSITE OXIDE CATALYST FOR CATALYZING PURIFICATION OF NITROGEN OXIDE, PREPARATION METHOD AND APPLICATION THEREOF

TECHNICAL FIELD

The present application belongs to the field of catalysts, and relates to a rare-earth-based composite oxide catalyst, a preparation method and an application thereof, and for example, relates to a cerium-tin-based composite oxide catalyst for catalytic purification of nitrogen oxide, a preparation method and an application thereof.

BACKGROUND

Currently, fossil fuels are the main energy used in the world, such as coal, oil and natural gas. In the flue gas generated by coal combustion, the nitrogen oxide ($NO_x$, mainly referring to NO and $NO_2$) is contained in addition to sulfur oxide ($SO_x$). In the exhaust gas emitted after petroleum fuels combustion, such as motor gasoline and motor diesel, $NO_x$ also accounts for a large proportion.

$NO_x$ existing in the atmosphere will cause serious environmental problems such as haze, photochemical smog and acid rain; besides, $NO_x$ has biological respiratory toxicity, causing a huge hazard to human health. Therefore, it has become a hotspot issue currently in the field of environmental protection about how to effectively eliminate $NO_x$.

With the increasing shortage of petroleum resources and the increasing pressure on $CO_2$ emission reduction, diesel vehicles with good fuel economy and strong power have been paid more and more attention. Compared with gasoline vehicles equipped with three-way catalysts, diesel vehicles are restricted in popularization and application due to the exhaust pollution characterized by $NO_x$ and PM. Diesel vehicles have become the main contributors to the $NO_x$ and PM emission of motor vehicles in China, and have become the key and difficult point in vehicle exhaust control. The exhaust emission of diesel vehicles has the characteristics of low temperature, high oxygen content, a large amount of particulate matter (PM) and a small amount of sulfur, of which $NO_x$ is consequently difficult to purify and eliminate.

At present, ammonia selective catalytic reduction of $NO_x$ ($NH_3$—SCR) is the most widely used flue gas denitration technology in the world. The $NH_3$—SCR catalyst used in industrial applications is usually $V_2O_5$—$WO_3$($MoO_3$)/$TiO_2$ catalyst containing the poisonous substance vanadium (V). During the using process of such catalyst, V is prone to separate and then enter the environment. Since $V^{5+}$ has great biological toxicity, it will pollute the environment, and consequently pose a threat to human health. Therefore, the application of such catalyst has been limited in $NO_x$ purification of diesel vehicle exhaust in Europe, the United States and Japan. More importantly, with the implementation of emission regulations such as Euro VI and China VI, it is necessary to use diesel particulate filter (DPF) in combination with $NO_x$ purification device so as to greatly reduce the emission of diesel particulate matter (PM) and $NO_x$. DPF regeneration will generate high temperature of more than 700° C., which makes more strict requirements on the hydrothermal stability of postposition $NO_x$ purification catalyst. Under such high temperature and water-containing conditions, the traditional vanadium-based catalyst will undergo the transformation of the carrier crystal form, resulting in a significant reduction in activity, which cannot meet the requirements of Euro VI, China VI or other emission regulations.

CN103433028A discloses a catalyst for three-effect removal of $NO_x$, CO and HC for marine engine. In the catalyst, cerium-tin-tungsten composite oxide is used as the catalytic active component, one or more oxides of cobalt, ferrum, copper, lanthanum, molybdenum, manganese, zirconium, silver and yttrium is (are) used as a promoter, and aluminum-silicon-titanium composite oxide is used as a carrier. Based on the carrier mass, the mass percentage of the catalytically active composition is 5% to 30%, and the mass percentage of the co-catalyst is 0.1% to 20%, wherein a molar ratio of Ce, Sn and W elements is 1:(0.1-3):(0.01-3) in the active composition of catalyst, and a molar ratio of Al, Si and Ti elements is 1:(0.05-2):(0.05-100) in the carrier. The catalyst has a high $NO_x$ removal efficiency, wide active temperature range, and high synergistic catalysis efficiency in removal of CO and HC under low-temperature; the catalyst compositions are non-toxic, environmental friendliness, high mechanical strength, excellent shock resistance, good thermal stability, simple preparation process and low cost. The disadvantage of this catalyst is: the catalyst is prepared through directly physically mixing the saturated solution of cerium-tin-tungsten, the saturated solution of the co-catalyst precursor, the carrier precursor and the like in this patent, and the interaction between the active compositions Ce—W—Sn is weak, and the interference of anions in the soluble salts used is not eliminated. The catalyst exhibits phase separation at a low temperature (400° C.), and precipitates CeW composite crystal phase at 700° C., of which the thermal stability needs to be improved; the catalyst has a low space velocity (7200 $h^{-1}$) for use, hardly satisfying the requirements from diesel vehicle exhaust purification for catalyst withstanding the high space velocity.

Therefore, it has a vital environmental significance to develop a novel catalyst system, which doesn't belong to vanadium catalyst system, with high $NH_3$—SCR activity, high hydrothermal stability, wide operating temperature window and non-toxic and harmless character for $NO_x$ catalytic elimination in a mobile source represented by diesel vehicle exhaust gas and a fixed source represented by flue gas from a coal-fired power plant.

SUMMARY

The following is the summary of the subject described detailedly in the present disclosure. This summary is not intended to limit the protection scope of the claims.

An object of the present application includes that for overcoming the disadvantages of the existing metal oxide catalyst system, such as narrow operating temperature window and poor hydrothermal stability, the present application firstly provides a novel cerium-tin-based composite oxide catalyst, a preparation method and an application thereof, which can be applied to the catalytic purification of nitrogen oxide (for example, nitrogen oxide in combustion exhaust gas). The catalyst of the present application has a wide range of application, which can be used for $NO_x$ catalytic purification in both a mobile source represented by diesel vehicle exhaust gas and a fixed source represented by flue gas from a coal-fired power plant. The present application can optionally be used for $NO_x$ catalytic purification of diesel vehicle exhaust.

To achieve the above object, the present application adopts the technical solution described below.

In a first aspect, the present application provides a cerium-tin-based composite oxide catalyst for catalytic purification of nitrogen oxide, in which the catalyst includes the following chemical composition: cerium oxide, tin oxide and amorphous $MO_x$, where M element is selected from any one or a combination of at least two of phosphorus (P), titanium (Ti), zirconium (Zr), vanadium (V), manganese (Mn), ferrum (Fe), copper (Cu), aluminum (Al), silicon (Si), nickel (Ni), hafnium (Hf), niobium (Nb), tantalum (Ta), chromium (Cr), molybdenum (Mo), tungsten (W) or rhenium (Re).

$MO_x$ is dispersed on the surfaces of cerium oxide and tin compound in a form of unimer, oligomer or amorphous cluster, where x is a number of O required to satisfy the valence balance of the elements;

A molar ratio of cerium element, tin element and M element is 1:(0.05-5.0):(0.05-3.5), and a molar ratio of M element and Sn element is (0.01-3):1.

The unimer refers to a single $MO_x$, and the oligomer refers to two or three $MO_x$ connected by oxygen bridge, and the amorphous cluster refers to a plurality of $MO_x$ connected by oxygen bridge. For example, when M is a positive hexavalent metal element, such as W (VI) or Mo (VI), the unimer refers to —O-M(=O)$_2$—; the oligomer refers to —O-M(=O)$_2$—O-M(=O)$_2$— or —O-M(=O)$_2$—O-M(=O)$_2$—O-M(=O)$_2$—; the amorphous cluster refers to (—O-M(=O)$_2$)$_n$ (n is an integer greater than 3, such as 4, 5, 6 or 7.).

The molar ratio of cerium (Ce) element, tin (Sn) element and M element is 1:(0.05-5.0):(0.05-3.5), such as 1:1.5:3.5, 1:0.05:2, 1:0.05:1, 1:0.05:0.1, 1:0.1:3.5, 1:0.1:3, 1:0.1:1.5, 1:0.1:0.5, 1:0.1:0.05, 1:0.5:3.5, 1:0.5:2.5, 1:0.5:2, 1:0.5:1, 1:0.5:0.05, 1:1.5:3.5, 1:1.5:2.5, 1:1.5:1, 1:1.5:0.5, 1:2:3.5, 1:2:2, 1:2:1.5, 1:2:0.5, 1:2:0.05, 1:3.5:3.5, 1:3.5:2, 1:3.5:1.5, 1:3.5:0.5, 1:3.5:0.05, 1:4.5:3.5, 1:4.5:3, 1:4.5:2.5, 1:4.5:1.5, 1:4.5:1, 1:4.5:0.1 or 1:4.5:0.05; the molar ratio of M element and Sn element is (0.01-3):1, such as 0.01:1, 0.05:1, 0.1:1, 0.2:1, 0.3:1, 0.4:1, 0.5:1, 0.8:1, 1:1, 1.5:1, 2:1, 2.3:1, 2.5:1 or 3:1.

In the cerium-tin-based composite oxide catalyst of the present application, cerium (Ce) element, tin (Sn) element and M element each exist as an oxide form in the composite oxide catalyst, and the oxide of M is amorphous $MO_x$. The cerium-tin-based composite oxide catalyst of the present application can be represented as $CeO_y$—$SnO_z$—$MO_x$, where x, y and z are independent for each other and are determined by the electron balance among various atoms with positive or negative valence.

The catalytic purification of nitrogen oxide described in the present application is the ammonia selective catalytic reduction of nitrogen oxide.

The present application provides a cerium-tin-based composite oxide catalyst. By introducing amorphous $MO_x$, on the one hand, the surface energy of $SnO_2$ is significantly reduced, so that the nanoparticle form can still be maintained after calcination at a high temperature of 800° C. (for example, 800° C.) during the catalyst preparation process; on the other hand, in the Ce—Sn-M ternary system, the composite crystallization of M and $CeO_2$ is inhibited, so that M can still be highly dispersed on surface of $SnO_2$ and $CeO_2$ after calcination at a high temperature (for example, 800° C.) during the catalyst preparation process to function as reactive sites. Additionally, after hydrothermal aging treatment at a higher temperature (for example, 900° C. or 1000° C.), the catalyst can still maintain the dispersed state. Compared with the traditional cerium-tin catalyst and the modified catalyst thereof, the cerium-tin-based composite oxide catalyst of the present application has advantages of the wide operating temperature window, high $NO_x$ conversion rate, good $N_2$ generation selectivity and good resistance to high temperature hydrothermal aging.

The following is the optional technical solution of the present application, but should not be constructed as limitation to the technical solution provided by the present application. Through the optional technical solution described below, the technical object and beneficial effect of the present application can be better achieved and realized.

Optionally, the oligomer includes dimer —O-M(=O)$_2$—O-M(=O)$_2$— and/or trimer —O-M(=O)$_2$—O-M(=O)$_2$—O-M(=O)$_2$—.

Optionally, in the cerium-tin-based composite oxide catalyst, a particle size of $CeO_2$ is 5 nm to 35 nm (such as 5 nm, 8 nm, 10 nm, 15 nm, 20 nm, 25 nm, 30 nm or 35 nm), a particle size of $SnO_2$ is 1 nm to 10 nm (such as 1 nm, 3 nm, 5 nm, 7 nm, 8 nm or 10 nm), and the particle size of the $SnO_2$ is smaller than the particle size of the $CeO_2$. In the cerium-tin-based composite oxide catalyst of the present application, no crystal phase is found in the oxide of M, and the oxide of M is highly dispersed on the surface of $CeO_2$ with a larger grain size and on the surface of $SnO_2$ with a smaller grain size, so that a higher stability is obtained.

Optionally, the molar ratio of M element and Sn element is (0.2-0.4):1; within such range, the surface energy of $SnO_2$ can be reduced advantageously, and the composite crystallization of M and $CeO_2$ can be inhibited.

Optionally, the M element is selected from any one or a combination of at least two of tungsten (W), molybdenum (Mo) or niobium (Nb). Optionally, the M element is selected from any one of Nb or W, or a combination of W and Nb with a molar ratio of (0.1-10):1, such as 0.1:1, 0.5:1, 1:1, 2:1, 3:1, 4:1, 5:1, 6:1, 7:1, 8:1 or 10:1. For the catalyst of the present application, the high-temperature stability can be achieved advantageously by introducing amorphous niobium oxide or amorphous tungsten oxide individually. By introducing the combination of amorphous tungsten oxide and amorphous niobium oxide according to the above molar ratio, W and Nb will exhibit the synergistic effect to further inhibit both the crystallization process during high temperature preparation and the recrystallization process during high temperature hydrothermal aging treatment for cerium-tin composite oxide; additionally, the high dispersion of W and Nb elements is maintained, which is conducive to keep the active sites, and keep the excellent low-temperature activity and high-temperature stability at the same time.

Optionally, the M element is W element, and the molar ratio of cerium (Ce) element, tin (Sn) element and M element is 1:(0.1-4.5):(0.08-3.0), and the molar ratio of M element and tin element is (0.05-3.5):1. Under the limitation of such molar ratio, the regulation of acidic sites and redox sites and the optimization of phase composition can be achieved for the catalyst, so that the more excellent comprehensive performance of the catalyst can be obtained.

In a second aspect, the present application provides a preparation method of the catalyst according to the first aspect, in which the preparation method includes a co-precipitation method, a sol-gel method, a citric acid complex method, a hydrothermal synthesis method, an impregnation method or the like.

The co-precipitation method comprises the following steps:

(1) subjecting a cerium salt, tin salt and M salt to the preparation of a mixed solution;

(2) with excess precipitant, carrying out the reaction by stirring the system at a temperature of 20° C. to 95° C. (such as 20° C., 25° C., 30° C., 35° C., 40° C., 50° C., 65° C., 80°

C. or 90° C.) for 0.5 h to 48 h (such as 0.5 h, 2 h, 5 h, 8 h, 12 h, 15 h, 18 h, 20 h, 24 h, 28 h, 32 h, 36 h, 40 h or 44 h);

(3) performing suction filtration and washing to obtain a filter cake; and (4) drying the filter cake, and calcining it in air at 500° C. to 1000° C. (such as 500° C., 600° C., 700° C., 800° C., 900° C. or 1000° C.) to obtain the cerium-tin-based composite oxide catalyst;

in the mixed solution, based on a molar ratio of metal elements, the molar ratio of cerium element, tin element and M element is 1:(0.05-5.0):(0.05-3.5), and the molar ratio of M element and Sn element is (0.01-3):1.

The "excess precipitant" in the present application means that after the chemical reaction is completed, in which the precipitant reacts with cerium salt, tin salt and M salt to form the cerium-tin-based composite oxide catalyst, there still remains precipitant.

Optionally, the precipitant includes any one or a combination of at least two of urea, aqueous ammonia, ammonium carbonate, ammonium bicarbonate, sodium carbonate, ammonium bicarbonate potassium carbonate or potassium bicarbonate; with the same metal precursor solution, the catalyst prepared with aqueous ammonia as the precipitant obtained the best $NH_3$—SCR reactivity, and the aqueous ammonia can make metal elements precipitate at room temperature; thereby the preferred precipitant is aqueous ammonia.

The sol-gel method comprises the following steps:

(1) subjecting a cerium salt, a tin salt and a M salt to the preparation of a mixed solution;

(2) stirring the mixed solution at room temperature for 0.5 h to 72 h (such as 0.5 h, 1 h, 3 h, 6 h, 8 h, 10 h, 12 h, 15 h, 18 h, 20 h, 24 h, 28 h, 32 h, 36 h, 40 h, 42 h, 50 h, 55 h, 60 h, 62 h, 66 h or 70 h) to obtain a sol;

(3) allowing the obtained sol to stand at normal temperature and pressure for 0.5 h to 12 d (such as 0.5 h, 3 h, 10 h, 15 h, 24 h, 1.5 d, 3 d, 6 d, 8 d, 10 d or 12 d) to obtain a gel; and (4) drying the gel, and calcining it in air at 500° C. to 1000° C. (such as 500° C., 600° C., 700° C., 800° C., 900° C. or 1000° C.) to obtain the cerium-tin-based composite oxide catalyst;

in the mixed solution, based on a molar ratio of metal elements, the molar ratio of cerium element, tin element and M element is 1:(0.05-5.0):(0.05-3.5), and the molar ratio of M element and Sn element is (0.01-3):1.

The citric acid complex method comprises the following steps:

(1) subjecting a cerium salt, a tin salt and a M salt to the preparation of a mixed solution;

(2) adding a certain amount of citric acid to the mixed solution, and a molar ratio of the total amount of metal ions and citric acid is 0.5-5.0;

(3) stirring the mixed solution at a temperature of 20° C. to 95° C. (such as 20° C., 25° C., 30° C., 35° C., 40° C., 50° C., 65° C., 80° C. or 90° C.) for 0.5 h to 48 h (such as 0.5 h, 2 h, 5 h, 8 h, 12 h, 15 h, 18 h, 20 h, 24 h, 28 h, 32 h, 36 h, 40 h or 44 h);

(4) allowing the mixed solution to stand at normal temperature and pressure for 0.5 h to 5 d (such as 0.5 h, 3 h, 10 h, 15 h, 24 h, 1.5 d, 3 d or 5 d); and (5) drying the obtained product, and calcining it in air at 500° C. to 1000° C. (such as 500° C., 600° C., 700° C., 800° C., 900° C. or 1000° C.) to obtain the cerium-tin-based composite oxide catalyst;

in the mixed solution, based on a molar ratio of metal elements, the molar ratio of cerium element, tin element and M element is 1:(0.05-5.0):(0.05-3.5), and the molar ratio of M element and Sn element is (0.01-3):1.

The hydrothermal synthesis method comprises the following steps:

(1) subjecting a cerium salt, a tin salt and a M salt to the preparation of a mixed solution;

(2) stirring the mixed solution at room temperature for 0.5 h to 2 h (such as 0.5 h, 1 h, 1.3 h, 1.5 h or 2 h), and then transferring the solution into a stainless steel reactor with polytetrafluoroethylene liner;

(3) allowing the reactor to stand at 80° C. to 200° C. (such as 80° C., 90° C., 100° C., 120° C., 125° C., 135° C., 150° C., 170° C., 180° C. or 200° C.) for 1 d to 12 d (such as 1 d, 3 d, 5 d, 8 d, 10 d or 12 d); and (4) centrifugally washing and drying the obtained product, and calcining it in air at 500° C. to 1000° C. (such as 500° C., 600° C., 700° C., 800° C., 900° C. or 1000° C.) to obtain the cerium-tin-based composite oxide catalyst;

in the mixed solution, based on a molar ratio of metal elements, the molar ratio of cerium element, tin element and M element is 1:(0.05-5.0):(0.05-3.5), and the molar ratio of M element and Sn element is (0.01-3):1.

The impregnation method comprises the following steps:

(1) subjecting a cerium salt and a tin salt to the preparation of a mixed solution;

(2) with excess precipitant, stirring the mixed solution at a temperature of 20° C. to 95° C. (such as 20° C., 25° C., 30° C., 35° C., 40° C., 50° C., 65° C., 80° C., 90° C. or 95° C.) for 0.5 h to 48 h (such as 0.5 h, 2 h, 5 h, 8 h, 12 h, 15 h, 18 h, 20 h, 24 h, 28 h, 32 h, 36 h, 40 h or 44 h);

(3) performing suction filtration and washing to obtain a filter cake;

(4) drying the filter cake, and calcining it in air at 500° C. to 1000° C. (such as 500° C., 600° C., 700° C., 800° C., 900° C. or 1000° C.) to obtain a cerium-tin composite oxide catalyst;

(5) preparing an M salt solution, and adding an appropriate amount of cerium-tin composite oxide catalyst into the M salt solution;

(6) stirring the mixed solution at a temperature of 40° C. to 95° C. (such as 40° C., 50° C., 60° C., 70° C., 75° C., 80° C., 82° C., 85° C., 88° C., 90° C. or 95° C.) for 0.5 h to 48 h (such as 0.5 h, 2 h, 5 h, 8 h, 12 h, 15 h, 18 h, 20 h, 24 h, 28 h, 32 h, 36 h, 40 h or 45 h) until the solution is evaporated to dryness completely, or subjecting the mixed solution to vacuum rotary evaporation at a temperature of 40° C. to 70° C. for 2 h to 6 h (such as 2 h, 3 h, 4 h, 5 h or 6 h) until the solution is evaporated to dryness completely; and (7) calcining the residue in air at 500° C. to 1000° C. (such as 500° C., 600° C., 700° C., 800° C., 900° C. or 1000° C.) to obtain the cerium-tin-based composite oxide catalyst;

based on a molar ratio of metal elements, in the mixed solution of step (1), a molar ratio of tin and cerium is 0.05-5.0, and the used amount of M salt solution and cerium-tin composite oxide catalyst described in step (5) satisfies: a molar ratio of M and cerium is 0.05-3.5, and the molar ratio of M and Sn is (0.01-3):1.

The "excess precipitant" in the present application means that after the chemical reaction is completed, in which the precipitant reacts with cerium salt, tin salt and M salt to form the cerium-tin-based composite oxide catalyst, there still remains precipitant.

Optionally, the precipitant includes any one or a combination of at least two of urea, aqueous ammonia, ammonium carbonate, ammonium bicarbonate, sodium carbonate, ammonium bicarbonate, potassium carbonate or potassium bicarbonate; with the same metal precursor solution, the catalyst prepared with aqueous ammonia as the precipitant obtained the best $NH_3$—SCR reactivity, and the aqueous ammonia can make metal elements precipitate at room temperature; thereby the preferred precipitant is aqueous ammonia.

For the cerium salt, tin salt and M salt that are included in the several preparation methods described above, the preferred ones are provided below, and the preferred ones are independent for each other in various preparation methods.

Optionally, the cerium salt includes any one or a combination of at least two of cerium chloride, cerium nitrate, cerium ammonium nitrate or cerium sulfate.

Optionally, the tin salt includes any one or a combination of at least two of tin chloride, stannous oxalate, tin nitrate or tin sulfate.

Optionally, the M salt includes M salts and/or acid salts. Taken W element as an example, its salt is optionally tungsten salt or tungstate, such as ammonium tungstate, ammonium paratungstate, ammonium metatungstate, tungsten nitrate, tungsten chloride or tungsten sulfate; taken Mo element as an example, its salt is optionally molybdenum salt or molybdate, such as ammonium molybdate, ammonium dimolybdate, ammonium tetramolybdate, molybdenum nitrate, molybdenum chloride or molybdenum sulfate; taken Nb element as an example, its salt is optionally niobium chloride, niobium nitrate, niobium oxalate or niobium ammonium sulfate.

Optionally, the M element in the M salt is selected from any one or a combination of at least two of W, Mo or Nb, and optionally selected from any one of Nb or W, or a combination of W and Nb with a molar ratio of (0.1-10):1.

Optionally, the calcination has a temperature of 750° C. to 850° C., such as 750° C., 775° C., 800° C., 820° C. or 850° C.

According to the optional M element species and optional calcination temperature, and combining with the limitation of the molar ratio described above, the catalyst performance can be improved advantageously.

The present application adopts non-toxic and harmless raw materials and the cerium-tin-based composite oxide catalyst is prepared by a simple and easy method which has the characteristics of high catalytic activity, high hydrothermal stability, excellent $N_2$ generation selectivity, a wide operating temperature window, and adaptation to high space velocity reaction conditions. The cerium-tin-based composite oxide catalyst can be applied to the nitrogen oxide catalytic purification device of a mobile source represented by diesel vehicle exhaust gas and a fixed source represented by flue gas from a coal-fired power plant.

In a third aspect, another object of the present application is to provide a method for catalytic purification of nitrogen oxide in gas, in which the cerium-tin-based composite oxide catalyst described in the first aspect is used.

The catalyst described in the present application may be optionally made into a slurry according to actual requirement, loaded on a carrier (such as various honeycomb ceramic carriers), and prepared into a shaped catalyst for catalytic purification of nitrogen oxide, or the catalyst may be optionally subjected to extrusion forming for catalytic purification of nitrogen oxide.

During use, the catalyst is placed in a pipeline of the gas to be treated (for example exhaust), a reducing agent is injected upstream of the catalyst to mix with the exhaust, the reducing agent is ammonia or urea (generating ammonia after hydrolyzation), and a molar amount of reducing agent is 0.8 times to 1.2 times as large as that of nitrogen oxide in the exhaust; with an oxygen-enriched condition, the catalyst can reduce $NO_x$ to $N_2$ and $H_2O$ in a wide temperature window, and has both excellent hydrothermal stability and $N_2$ selectivity at the same time.

Optionally, the gas to be treated includes a mobile source nitrogen oxide-containing gas or a fixed source nitrogen oxide-containing gas, which optionally is selected from diesel vehicle exhaust.

The catalyst of the present application is particularly suitable for catalytic purification of nitrogen oxide in diesel vehicle exhaust.

Compared with the prior art, the present application has at least the advantages described below.

(1) The cerium-tin-based composite oxide catalyst described in the present application has good hydrothermal stability and wide operating temperature window, and is suitable for the application circumstance having a large variation range of exhaust gas temperature, especially for catalytic purification of nitrogen oxide in vehicle exhaust;

(2) has very excellent $N_2$ generation selectivity, which can reach more than 99%;

(3) has very excellent resistance to high-temperature sintering; after hydrothermal aging test at 800° C. to 900° C. for 16 h, the obtained catalyst can still keep a wide window, high $NO_x$ conversion rate and $N_2$ generation selectivity at a space velocity of 120,000 $h^{-1}$, which is almost equivalent to the catalyst before aging.

(4) For the cerium-tin-based composite oxide catalyst of the present application, the molar ratio of cerium element, tin element and M element and the M element species are optimized; after optimization, the molar ratio of cerium element, tin element is limited within 1:(0.05-5.0):(0.05-3.5), and the molar ratio of M element and Sn element is (0.01-3):1, accordingly giving excellent comprehensive performance; after testing, the catalyst can achieve both the $NO_x$ conversion rate of more than or equal to 90% and the $N_2$ generation selectivity of more than 98% at the space velocity of 120,000 $h^{-1}$ and within the whole temperature range of 250° C. to 500° C.; after hydrothermal aging at 800° C. to 900° C. for 16 h, the catalyst can still achieve both the $NO_x$ conversion rate of more than or equal to 90% and the $N_2$ generation selectivity of more than 99% at the space velocity of 120,000 $h^{-1}$ and within the whole temperature range of 300° C. to 500° C.; such catalyst has very excellent resistance to high temperature hydrothermal aging.

(5) The non-toxic compositions are adopted, effectively reducing the hazard to human health and the ecological environment.

Other aspects will become apparent upon reading and understanding the detailed description and accompanying drawings.

DETAILED DESCRIPTION

Figure 1:
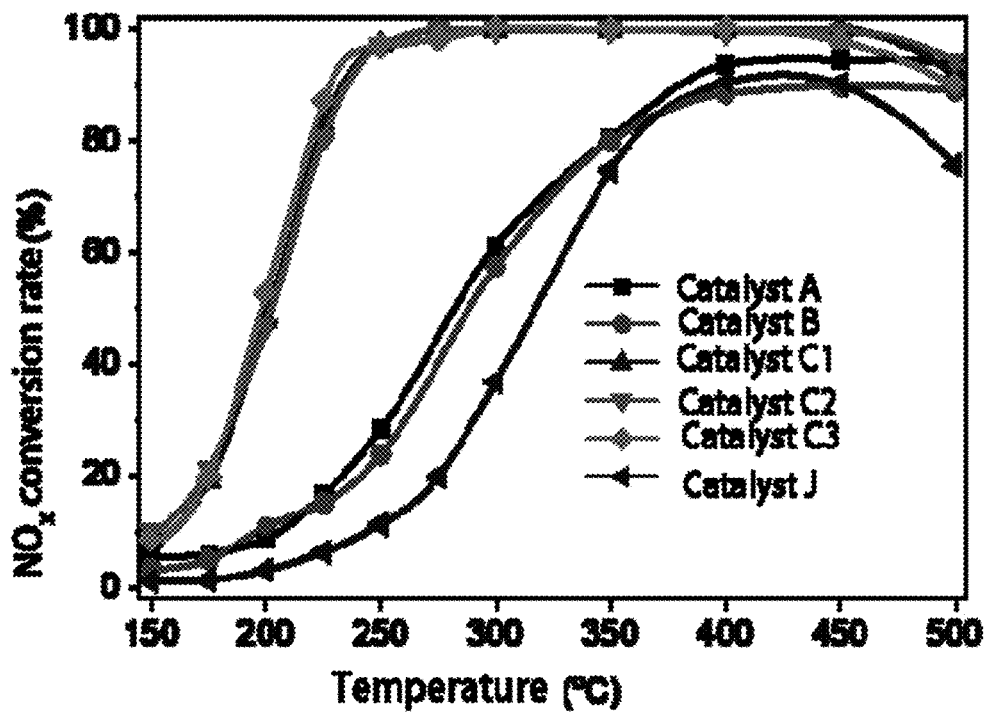
FIG. 1 is a diagram that shows the relationship that the nitrogen conversion rates of the catalysts described in Examples 1-5 and Comparative Example 1 change along with the temperature.

The technical solution of the present application will be further described below with reference to the accompanying drawing and through specific embodiments.

To facilitate the understanding of the present application, the present application lists the following examples. Those skilled in the art should understand that the examples described herein are merely used for a better understanding of the present application and should not be construed as specific limitations to the present application.

EXAMPLE 1

This example provides a cerium-tin-based composite oxide catalyst, of which the preparation method is as follows:

ammonium metatungstate, cerium nitrate and tin chloride were dissolved in deionized water in sequence, and a solution having Ce:Sn:W with a molar ratio of 1:0.8:0.6 (the molar ratio of W and Sn was 0.75:1) was prepared and shaken uniformly; 30 mL of aqueous ammonia was added to the solution; the mixture was stirred continuously at 25° C. for 12 h, and then subjected to suction filtration and washing; the filter cake was placed in an oven and dried at 100° C. overnight, and finally calcined through a muffle furnace in air at 800° C. for 3 h to prepare the target catalyst.

The prepared catalyst was ground and sieved, so as to obtain the catalyst with particle size of 40 mesh to 60 mesh, and such catalyst was called Catalyst A.

EXAMPLE 2

This example provides a cerium-tin-based composite oxide catalyst, of which the preparation method is as follows:

other conditions remained unchanged as in Example 1, except the precipitant of aqueous ammonia was replaced with 40 g of urea, and the precipitation temperature was set to 90° C., so as to prepare Catalyst B.

EXAMPLE 3

This example provides a cerium-tin-based composite oxide catalyst, of which the preparation method is as follows:

other conditions remained unchanged as in Example 1, except the molar ratio of Ce:Sn:W was changed to 1:2:0.5 (the molar ratio of W and Sn was 0.25:1), so as to prepare Catalyst C1.

EXAMPLE 4

This example provides a cerium-tin-based composite oxide catalyst, of which the preparation method is as follows:

other conditions remained unchanged as in Example 1, and the molar ratio of Ce:Sn:W was changed to 1:1.5:0.5 (the molar ratio of W and Sn was 0.33:1), so as to prepare Catalyst C2.

EXAMPLE 5

This example provides a cerium-tin-based composite oxide catalyst, of which the preparation method is as follows:

other conditions remained unchanged as in Example 1, and the molar ratio of Ce:Sn:W was changed to 1:1:0.1 (the molar ratio of W and Sn was 0.01:1), so as to prepare Catalyst C3.

EXAMPLE 6

This example provides a cerium-tin-based composite oxide catalyst, of which the preparation method is as follows:

Catalyst C1 was aged at 800° C. in air containing 10% water for 16 h, so as to prepare Catalyst D.

EXAMPLE 7

This example provides a cerium-tin-based composite oxide catalyst, of which the preparation method is as follows:

Catalyst C1 was aged at 900° C. in air containing 10% water for 16 h, so as to prepare Catalyst E.

EXAMPLE 8

This example provides a cerium-tin-based composite oxide catalyst, of which the preparation method is as follows:

other conditions remained unchanged as in Example 3, except ammonium tungstate was replaced with ammonium molybdate, so as to prepare Catalyst F.

EXAMPLE 9

This example provides a cerium-tin-based composite oxide catalyst, of which the preparation method is as follows:

niobium oxalate, cerium nitrate and tin chloride were dissolved in deionized water in sequence, and a solution having Ce:Sn:Nb with a molar ratio of 1:2:1 (the molar ratio of Nb and Sn was 0.5:1) was prepared and shaken uniformly; 40 mL of aqueous ammonia was added to the solution; the mixture was stirred continuously at 25° C. for 12 h, and then subjected to suction filtration and washing; the filter cake was placed in an oven and dried at 90° C. overnight, and finally calcined through a muffle furnace in air at 800° C. for 5 h to prepare the catalyst as powder.

The prepared catalyst was compressed into tablets, ground and sieved, and the particle of 40 mesh to 60 mesh was taken for later use, which was called Catalyst G.

EXAMPLE 10

This example provides a cerium-tin-based composite oxide catalyst, of which the preparation method is as follows:

ammonium metatungstate, niobium oxalate, cerium nitrate and tin chloride were dissolved in deionized water in sequence, and a solution having Ce:Sn:W:Nb with a molar ratio of 1:2:0.24:0.76 (the molar ratio of W+Nb and Sn was 0.5:1) was prepared and shaken uniformly; citric acid was added to the mixed solution; a molar ratio of the total amount of metal ions and citric acid was 1; the mixture was stirred continuously at 30° C. for 24 h, and allowed to stand for 3 d at normal temperature and pressure; the obtained product was dried and then calcined through a muffle furnace in air at 500° C. for 3h to prepare the catalyst as powder. The prepared catalyst was compressed into tablets, ground and sieved, and the particle of 40 mesh to 60 mesh was taken for later use, so as to obtain Catalyst H.

EXAMPLE 11

This example provides a cerium-tin-based composite oxide catalyst, of which the preparation method is as follows:

cerium nitrate and tin chloride were dissolved in deionized water in sequence, and a solution having Ce:Sn with a molar ratio of 1:2 was prepared and shaken uniformly; with 30 mL of aqueous ammonia as precipitant, the mixture was stirred at 30° C. for 12 h, and then subjected to suction filtration and washing to obtain a filter cake; the filter cake was dried and then calcined in air at 600° C. to obtained a cerium-tin composite oxide carrier; 0.6 g of $(NH_4)_3PO_4$ was dissolved in deionized water to prepare a solution; 2 g of the cerium-tin composite oxide carrier was added to the above solution; the mixture was stirred at 80° C. until the aqueous solution was evaporated to dryness completely; the residue was calcined at 600° C. in air to obtain the 15% wt.$PO_x$/ $Ce_1Sn_2O_x$ catalyst (x was a number of O required to satisfy the valence balance of the elements), so as to obtain Catalyst I.

EXAMPLE 12

This example provides a cerium-tin-based composite oxide catalyst, of which the preparation method is as follows:

other conditions remained unchanged as in Example 3, and the calcination temperature was replaced with 500° C., so as to prepare Catalyst K.

EXAMPLE 13

This example provides a cerium-tin-based composite oxide catalyst, of which the preparation method is as follows:

other conditions remained unchanged as in Example 3, and the calcination temperature was replaced with 900° C., so as to prepare Catalyst L.

EXAMPLE 14

This example provides a cerium-tin-based composite oxide catalyst, of which the preparation method is as follows:

other conditions remained unchanged as in Example 3, and ammonium metatungstate was replaced by a mixture of ammonium metatungstate and niobium oxalate in a molar ratio of 4:1, so as to prepare Catalyst M.

COMPARATIVE EXAMPLE 1

This comparative example is different from Example 5 in that ammonium tungstate was not added, so as to prepare Catalyst J.

APPLICATION EXAMPLE

The reaction activity for $NH_3$ selective catalytic reduction of $NO_x$ was investigated with applying the cerium-tin-based composite oxide catalysts prepared in Examples 1-14 and Comparative Example 1 to a fixed-bed reactor.

The use amount of catalyst was 0.5 g, and the composition of the reaction gas mixture included: [NO]=[$NH_3$]=500 ppm, [$O_2$]=5 vol. %, 5 vol. % $H_2O$ and $N_2$ was used as an equilibrium gas; the total gas flow was 500 mL/min, the space velocity was 120,000 $h^{-1}$, and the reaction temperature was 150° C. to 500° C. NO, $NH_3$ and by-product $N_2O$ and $NO_2$ were all detected using an infrared gas cell. The reaction results are shown in Table 1.

FIG. 1 is a diagram that shows the relationship that the nitrogen conversion rates of the catalysts described in Examples 1-5 and Comparative Example 1 change along with the temperature.

Figure 2:
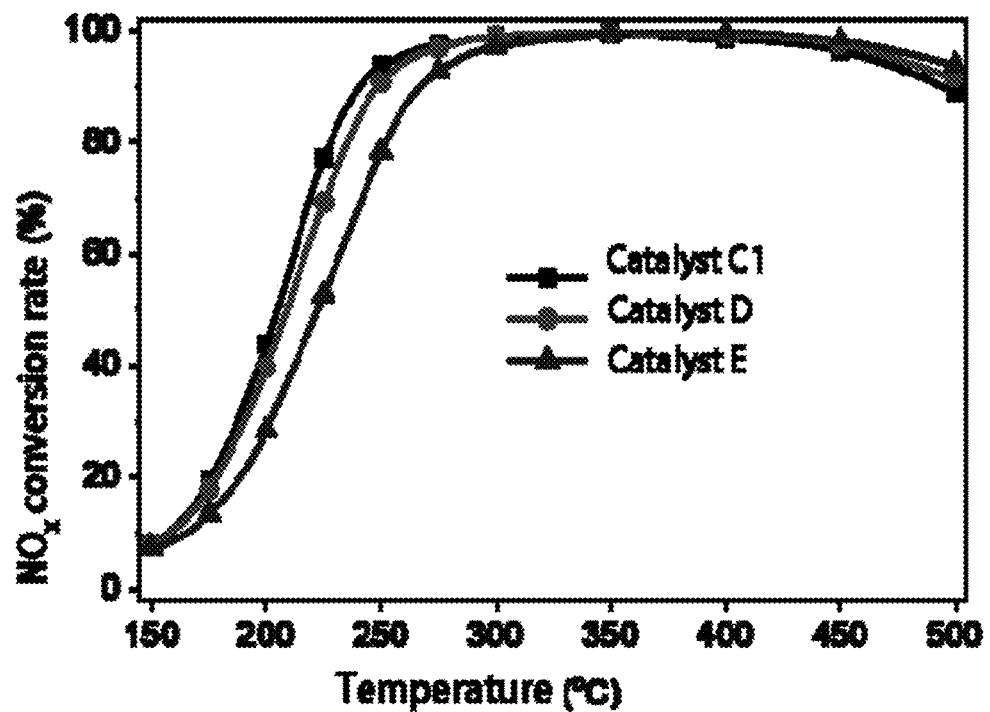
FIG. 2 is a diagram that shows the relationship that the nitrogen conversion rates of the catalysts described in Examples 3, 6 and 7 change along with the temperature.
Figure 3A:
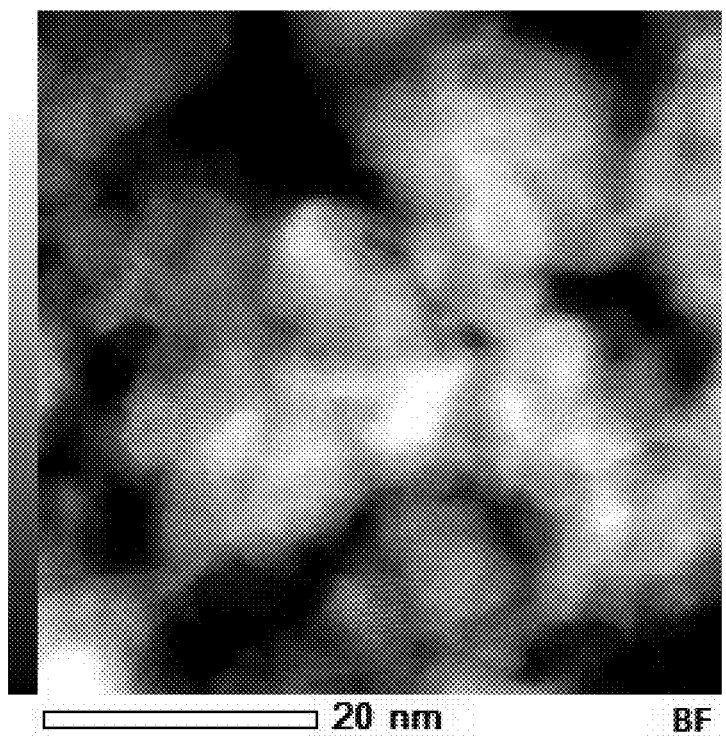
FIG. 3a-3d show the FE-SEM (field emission scanning electron microscope) image of the catalyst provided in Example 3, and the Sn, W and Ce element distribution results in sequence.
Figure 3B:
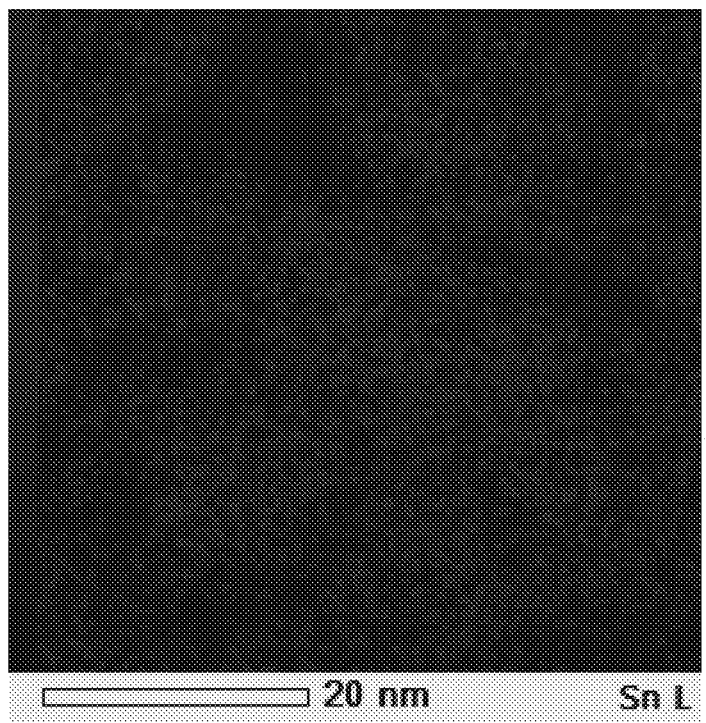
Figure 3C:
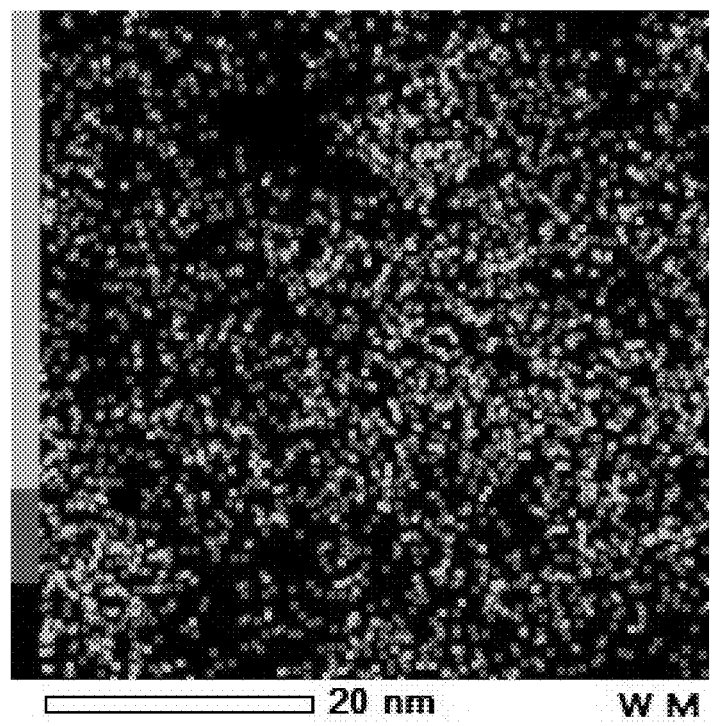
Figure 3D:
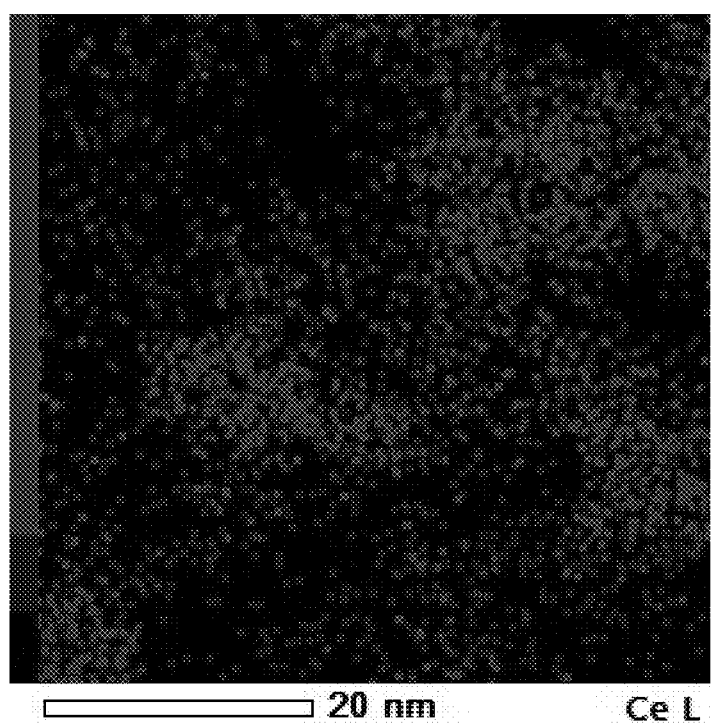

FIG. 2 is a diagram that shows the relationship that the nitrogen conversion rates of the catalysts described in Examples 3, 6 and 7 change along with the temperature.

FIG. 3a-3d show the FE-SEM image of the catalyst described in Example 3 and the respective images of element distribution results, from which it can be found that Sn element agglomerated together and Ce element agglomerated together, while W element was uniformly distributed on the catalyst surface.

Figure 4:
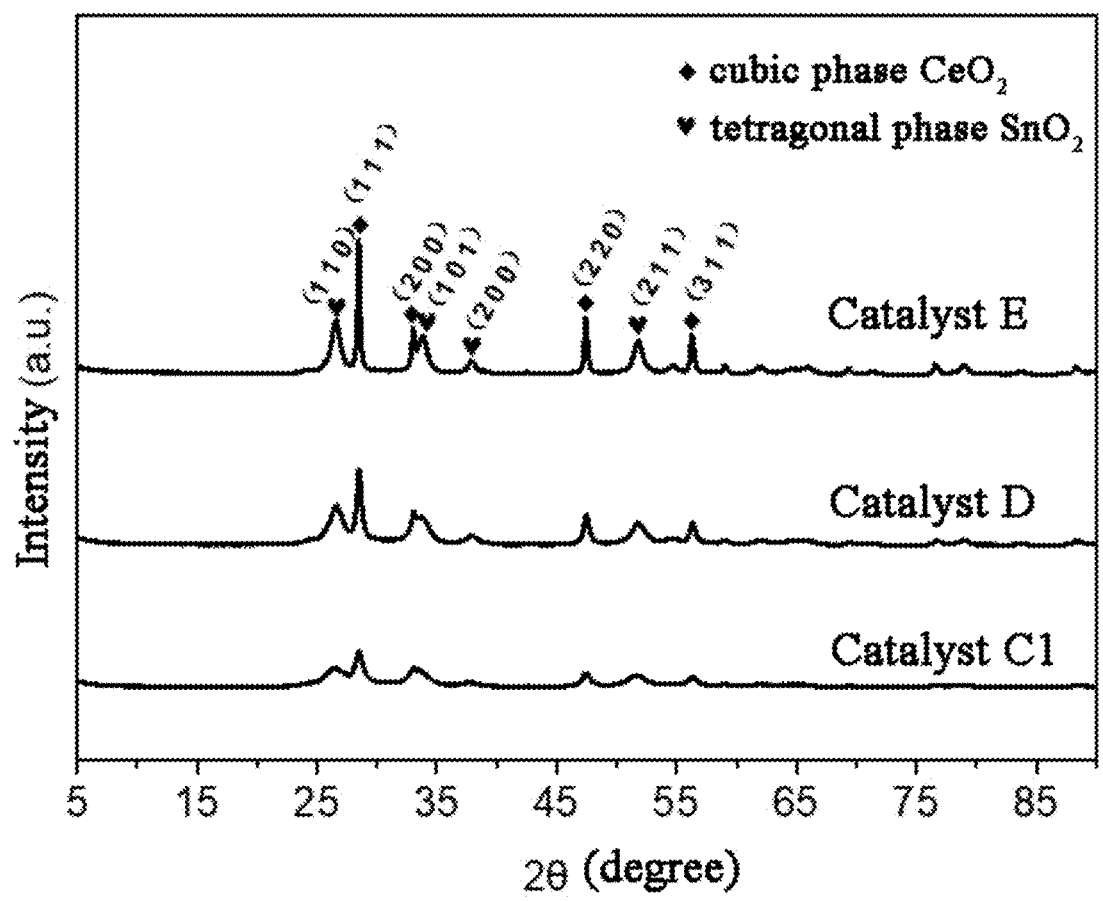
FIG. 4 shows the XRD (X-Ray Diffraction) comparison among the catalysts described in Examples 3, 6 and 7.

FIG. 4 shows the XRD comparison among the catalysts described in Examples 3, 6 and 7, from which it can be found that only diffraction spectra of cubic phase $CeO_2$ and tetragonal phase $SnO_2$ were obtained by detecting the three catalysts, and no tungsten phase was observed, and with the elemental analysis results in FIG. 3, it is proved that M existed in an amorphous state.

TABLE 1

Activity evaluation result of cerium-tin-based composite oxide catalyst

| | | $NO_x$ conversion rate at different temperature (%) | | | | | | |
|---|---|---|---|---|---|---|---|---|
| No. | | 150° C. | 200° C. | 250° C. | 300° C. | 350° C. | 400° C. | 500° C. |
| Example 1 | A | 5.5 | 8.7 | 28.3 | 61.2 | 80.6 | 93.6 | 93.3 |
| Example 2 | B | 3.3 | 10.8 | 23.8 | 57.4 | 79.9 | 88.4 | 89.0 |
| Example 3 | C1 | 8.2 | 47.9 | 97.3 | 100 | 100 | 100 | 91.9 |
| Example 4 | C2 | 9.9 | 46.7 | 97.1 | 100 | 100 | 100 | 94.0 |
| Example 5 | C3 | 8.2 | 52.7 | 96.9 | 100 | 99.9 | 100 | 89.9 |
| Example 6 | D | 8.1 | 39.7 | 90.8 | 99.1 | 99.6 | 98.9 | 91.4 |
| Example 7 | E | 7.4 | 28.4 | 78.4 | 97.2 | 99.4 | 99.7 | 93.8 |
| Example 8 | F | 5.2 | 31.2 | 87.4 | 98.7 | 99.4 | 99.0 | 77.0 |
| Example 9 | G | 8.0 | 47.7 | 97.4 | 100 | 100 | 100 | 94.0 |

TABLE 1-continued

Activity evaluation result of cerium-tin-based composite oxide catalyst

| No. | | NO$_x$ conversion rate at different temperature (%) | | | | | | |
|---|---|---|---|---|---|---|---|---|
| | | 150° C. | 200° C. | 250° C. | 300° C. | 350° C. | 400° C. | 500° C. |
| Example 10 | H | 8.0 | 46.8 | 96.9 | 100 | 100 | 100 | 90 |
| Example 11 | I | 6.5 | 45.8 | 95.4 | 100 | 100 | 100 | 98.8 |
| Example 12 | K | 14.1 | 70.4 | 96.7 | 100 | 99.9 | 97.4 | 52.0 |
| Example 13 | L | 8.2 | 38.7 | 91.2 | 99.8 | 100 | 100 | 96.6 |
| Example 14 | M | 8.2 | 52.7 | 100 | 100 | 99.9 | 100 | 95 |
| Comparative Example 1 | J | 1.1 | 3.1 | 11.3 | 36.9 | 74.8 | 90.3 | 75.7 |

It can be seen from Table 1 that the performance of catalysts C1 and C2 in NH$_3$—SCR was significantly better than that of catalysts A, B and C3, indicating that the molar ratio of Ce, Sn and W has a preferred range; the catalyst would have a better effect when elements cerium, tin and M had a molar ratio of 1:(0.05-5.0):(0.05-3.5) and elements M and Sn had a molar ratio of (0.2-0.4):1; with a space velocity of 120,000 h$^{-1}$ and a temperature range of 250° C. to 500° C., both catalyst C1 and catalyst C2 could achieve the NO$_x$ conversion rate of more than or equal to 90%, and all the N$_2$ selectivity was greater than 98%.

Catalyst D obtained after hydrothermal aging at 800° C. for 16 h was still able to achieve the NO$_x$ conversion rate of more than 90% with a space velocity of 120,000 h$^{-1}$ and a temperature range of 250° C. to 500° C., and all the N$_2$ generation selectivity was greater than 99%; Catalyst E obtained after hydrothermal aging at 900° C. for 16 h was still able to achieve the NO$_x$ conversion rate of more than 90% with a space velocity of 120,000 h$^{-1}$ and a temperature range of 300° C. to 500° C., and all the N$_2$ generation selectivity was greater than 98%, indicating that such catalyst has excellent resistance to high temperature hydrothermal aging.

Through comparing Example 1 and Example 2, it is found that the performance of the catalyst prepared by using the aqueous ammonia precipitant is better than that of the catalyst prepared by using the urea precipitant.

Through comparing Example 3 and Example 12, it is found that the calcination treatment with relatively low temperature (500° C.) significantly improves the activity of catalyst for low temperature NH$_3$—SCR, which is mainly resulted from that the catalyst obtained by the low temperature calcination has a larger specific surface area, thereby facilitating the coupling and dispersion of more acidic sites and redox sites.

Through comparing Example 3 and Example 13, it is found that the calcination treatment with relatively high temperature (900° C.) significantly improves the activity of catalyst for high temperature NH$_3$—SCR, which is mainly resulted from that the calcination treatment with relatively high temperature inhibits the catalyst from nonselective oxidation of ammonia gas in the high temperature section, thereby facilitating more NH$_3$ to participate in the NH$_3$—SCR reaction.

Through comparing Example 3 and Example 14, the use of W and Nb in a specific molar ratio can have both excellent low-temperature activity and high-temperature stability, which is mainly due to the synergistic effect of W and Nb.

The applicant has stated that although the specific process equipment and process flow in the present application are described through the above embodiments, the present application is not limited to the above specific process equipment and process flow, which means that the present application does not necessarily depend on the above specific process equipment and process flow to be implemented.

The applicant has stated that although the detailed method in the present application is described through the above embodiments, the present application is not limited to the above detailed method, which means that the present application does not necessarily depend on the above detailed method to be implemented.

What is claimed is:

1. A cerium-tin-based composite oxide catalyst for catalytic purification of nitrogen oxide, comprising the following chemical composition: cerium oxide, tin oxide and amorphous MO$_x$, wherein the M element is selected from any one or a combination of at least two of P, Ti, V, Mn, Fe, Cu, Al, Si, Ni, Hf, or Re;

MO$_x$ is dispersed on the surfaces of cerium oxide and tin oxide in a form of unimer, oligomer, or amorphous cluster, wherein x is a number of O required to satisfy the valence balance of the elements;

a molar ratio of cerium element, tin element, and M element is 1:(0.05-5.0):(0.05-3.5), and a molar ratio of M element and Sn element is (0.01-3):1.

2. The catalyst according to claim 1, wherein, in the cerium-tin-based composite oxide catalyst, a particle size of CeO$_2$ is 5 nm to 35 nm, a particle size of SnO$_2$ is 1 nm to 10 nm, and the particle size of SnO$_2$ is smaller than the particle size of CeO$_2$;

optionally, the oligomer comprises dimer and/or trimer;

optionally, the molar ratio of M element and Sn element is (0.2-0.4):1.

3. The catalyst according to claim 1, wherein the M element further includes any one or a combination of at least two of W, Mo or Nb, and optionally selected from any one of Nb or W, or a combination of W and Nb in a molar ratio (0.1-10):1;

optionally, the M element further includes W element, and a molar ratio of cerium element, tin element and W element is 1:(0.1-4.5):(0.08-3.0), and the molar ratio of M element and Sn element is (0.03-3):1.

4. A preparation method of the catalyst according to claim 1, comprising a co-precipitation method, a sol-gel method, a citric acid complex method, a hydrothermal synthesis method or an impregnation method.

5. The preparation method according to claim 4, wherein the co-precipitation method comprises the following steps:
(1) subjecting a cerium salt, a tin salt and a M salt to the preparation of a mixed solution;
(2) with excess precipitant, carrying out the reaction by stirring the system at a temperature of 20° C. to 95° C. for 0.5 h to 48 h;
(3) performing suction filtration and washing to obtain a filter cake; and (4) drying the filter cake, and calcining it in air at 500° C. to 1000° C. to obtain the cerium-tin-based composite oxide catalyst;

in the mixed solution, based on a molar ratio of metal elements, the molar ratio of cerium element, tin element and M element is 1:(0.05-5.0):(0.05-3.5), and the molar ratio of M element and Sn element is (0.01-3):1;

optionally, the precipitant comprises any one or a combination of at least two of urea, aqueous ammonia, ammonium carbonate, ammonium bicarbonate, sodium carbonate, ammonium bicarbonate, potassium carbonate or potassium bicarbonate, and is optionally selected from aqueous ammonia.

6. The preparation method according to claim 4, wherein the sol-gel method comprises the following steps:
   (1) subjecting a cerium salt, a tin salt and a M salt to the preparation of a mixed solution;
   (2) stirring the mixed solution at room temperature for 0.5 h to 72 h to obtain a sol;
   (3) allowing the obtained sol to stand at normal temperature and pressure for 0.5 h to 12 d to obtain a gel; and
   (4) drying the gel, and calcining it in air at 500° C. to 1000° C. to obtain the cerium-tin-based composite oxide catalyst;
   in the mixed solution, based on a molar ratio of metal elements, the molar ratio of cerium element, tin element and M element is 1:(0.05-5.0):(0.05-3.5), and the molar ratio of M element and Sn element is (0.01-3):1.

7. The preparation method according to claim 4, wherein the citric acid complex method comprises the following steps:
   (1) subjecting a cerium salt, a tin salt and a M salt to the preparation of a mixed solution;
   (2) adding a certain amount of citric acid to the mixed solution, and a molar ratio of the total amount of metal ions and citric acid is 0.5-5.0;
   (3) stirring the mixed solution at a temperature of 20° C. to 95° C. for 0.5 h to 48 h;
   (4) allowing the mixed solution to stand at normal temperature and pressure for 0.5 h to 5 d; and
   (5) drying the obtained product, and calcining it in air at 500° C. to 1000° C. to obtain the cerium-tin-based composite oxide catalyst;
   in the mixed solution, based on a molar ratio of metal elements, the molar ratio of cerium element, tin element and M element is 1:(0.05-5.0):(0.05-3.5), and the molar ratio of M element and Sn element is (0.01-3):1.

8. The preparation method according to claim 4, wherein the hydrothermal synthesis method comprises the following steps:
   (1) subjecting a cerium salt, a tin salt and a M salt to the preparation of a mixed solution;
   (2) stirring the mixed solution at room temperature for 0.5 h to 2 h, and then transferring the solution into a stainless steel reactor with polytetrafluoroethylene liner;
   (3) allowing the reactor to stand at 80° C. to 200° C. for 3 h to 12 d; and
   (4) centrifugally washing and drying the obtained product, and calcining it in air at 500° C. to 1000° C. to obtain the cerium-tin-based composite oxide catalyst;
   optionally, in the mixed solution, based on a molar ratio of metal elements, the molar ratio of cerium element, tin element and M element is 1:(0.05-5.0):(0.05-3.5), and the molar ratio of M element and Sn element is (0.01-3):1.

9. The preparation method according to claim 4, wherein the impregnation method comprises the following steps:
   (1) subjecting a cerium salt and a tin salt to the preparation of a mixed solution;
   (2) with excess precipitant, stirring the mixed solution at a temperature of 20° C. to 95° C. for 0.5 h to 48 h;
   (3) performing suction filtration and washing to obtain a filter cake;
   (4) drying the filter cake, and calcining it in air at 500° C. to 1000° C. to obtain a cerium-tin composite oxide catalyst;
   (5) preparing an M salt solution, and adding an appropriate amount of cerium-tin composite oxide catalyst into the M salt solution;
   (6) stirring the mixed solution at a temperature of 40° C. to 95° C. for 0.5 h to 48 h until the solution is evaporated to dryness completely, or subjecting the mixed solution to vacuum rotary evaporation at a temperature of 40° C. to 70° C. for 2 h to 6 h until the solution is evaporated to dryness completely; and
   (7) calcining the residue in air at 500° C. to 1000° C. to obtain the cerium-tin-based composite oxide catalyst;
   based on a molar ratio of metal elements, in the mixed solution of step (1), a molar ratio of tin and cerium is 0.05-5.0, and the used amount of M salt solution and cerium-tin composite oxide catalyst described in step (5) satisfies: a molar ratio of M and cerium is 0.05-3.5, and the molar ratio of M and Sn is (0.01-3):1.

10. The preparation method according to claim 4, wherein the cerium salt comprises any one or a combination of at least two of cerium chloride, cerium nitrate, cerium ammonium nitrate or cerium sulfate;
    optionally, the tin salt comprises any one or a combination of at least two of tin chloride, stannous oxalate, tin nitrate or tin sulfate;
    optionally, the M salt comprises M salts and/or acid salts;
    optionally, the M element in the M salt further includes any one or a combination of at least two of W, Mo or Nb, and optionally selected from any one of Nb or W, or a combination of W and Nb in a molar ratio of (0.1-10):1;
    optionally, the calcination has a temperature of 750° C. to 850° C.

11. A method for catalytic purification of nitrogen oxide in a gas, wherein the cerium-tin-based composite oxide catalyst according to claim 1 is utilized in the method.

12. The method according to claim 11, wherein the method comprises: loading the cerium-tin-based composite oxide catalyst to a carrier, preparing and forming to obtain catalyst, for use in catalytic purification of nitrogen oxide in a gas.

13. The method according to claim 11, wherein, during use, the catalyst is placed in a pipeline of the gas to be treated, a reducing agent is injected upstream of the catalyst to mix with the gas to be treated, the reducing agent is ammonia and/or urea, and a molar amount of reducing agent is 0.8 times to 1.2 times as large as that of nitrogen oxide in the gas to be treated; optionally, the gas to be treated comprises a mobile source nitrogen oxide-containing gas or a fixed source nitrogen oxide-containing gas, which optionally is selected from diesel vehicle exhaust.

\* \* \* \* \*